(12) United States Patent
Jachmann et al.

(10) Patent No.: US 9,995,820 B2
(45) Date of Patent: Jun. 12, 2018

(54) DISTANCE-MEASURING SENSOR AND METHOD FOR DETECTING AND DETERMINING THE DISTANCE OF OBJECTS

(71) Applicant: SICK AG, Waldkirch (DE)

(72) Inventors: Fabian Jachmann, Waldkirch (DE); Michael Engler, Waldkirch (DE); Bernd Rothenberger, Waldkirch (DE); Thomas Dollmann, Waldkirch (DE)

(73) Assignee: SICK AG, Waldkirch (DE)

( * ) Notice: Subject to any disclaimer, the term of this patent is extended or adjusted under 35 U.S.C. 154(b) by 559 days.

(21) Appl. No.: 14/704,213

(22) Filed: May 5, 2015

(65) Prior Publication Data

US 2015/0323654 A1 Nov. 12, 2015

(30) Foreign Application Priority Data

May 8, 2014 (DE) .......................... 10 2014 106 465

(51) Int. Cl.
*G01C 3/08* (2006.01)
*G01S 7/486* (2006.01)
(Continued)

(52) U.S. Cl.
CPC ............ *G01S 7/4865* (2013.01); *G01S 7/487* (2013.01); *G01S 7/4873* (2013.01); *G01S 17/08* (2013.01); *G01S 17/10* (2013.01); *G01S 17/42* (2013.01)

(58) Field of Classification Search
CPC ...... G01S 7/4865; G01S 7/487; G01S 7/4873; G01S 17/08; G01S 17/10; G01S 17/42
See application file for complete search history.

(56) References Cited

U.S. PATENT DOCUMENTS

| 7,335,071 B1* | 2/2008 | Motsenbocker ....... B63H 23/30 440/1 |
| 2009/0119044 A1 | 5/2009 | Levesque |
| 2010/0128248 A1* | 5/2010 | Heizmann ............... G01S 7/484 356/5.01 |

FOREIGN PATENT DOCUMENTS

| DE | 41 33 196 A1 | 4/1992 |
| DE | 10 2011 056 963 B3 | 9/2012 |

(Continued)

OTHER PUBLICATIONS

"Analog-Digital-Umsetzer", In Wikipedia, retrieved Nov. 24, 2015, from https://de.wikipedia.org/wiki/Analog-Digital-Umsetzer.

*Primary Examiner* — Samantha K Abraham
(74) *Attorney, Agent, or Firm* — Nath, Goldberg & Meyer; Jerald L. Meyer; Stanley N. Protigal

(57) ABSTRACT

A distance-measuring sensor (10) is provided for detecting and determining the distance of objects (18) in a monitored zone comprising a transmitter (12) for transmitting transmitted pulses; a receiver (20) for generating a received signal from the transmitted pulses remitted in the monitored zone; a first comparator unit (36*a*) for digitizing the received signal with reference to a first threshold; and a control and evaluation unit (30) which is configured to transmit a plurality of transmitted pulses via the transmitter (12), to collect the received signals thereupon generated by the receiver (20) in a histogram and to determine a received time point from the histogram and thus to determine a measured value for the signal transit time from the sensor (10) to the object (18). In this respect, a second comparator unit (36*b*) is provided for digitizing the received signal with reference to a second threshold, wherein the first comparator unit (36*a*), the second comparator unit (36*b*) and the control and evaluation unit (30) are configured to acquire three digital states of a respective section of the received signal with (Continued)

Figure 1:
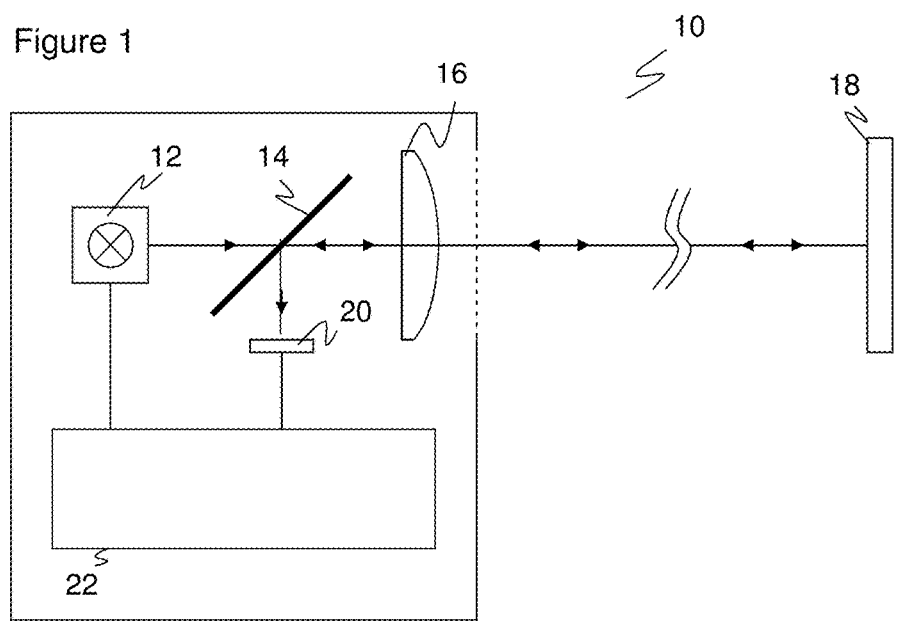

reference to the first threshold and to weight the contributions of the section to the histogram in dependence on the digital state.

13 Claims, 4 Drawing Sheets

(51) Int. Cl.
  *G01S 17/08* (2006.01)
  *G01S 7/487* (2006.01)
  *G01S 17/10* (2006.01)
  G01S 17/42 (2006.01)

(56) References Cited

FOREIGN PATENT DOCUMENTS

| | | |
|---|---|---|
| EP | 1972961 A2 | 9/2008 |
| EP | 1 972 961 A3 | 11/2008 |
| EP | 2 189 804 A1 | 5/2010 |
| EP | 2 189 805 A1 | 5/2010 |
| EP | 2 469 296 A1 | 6/2012 |
| WO | 98/05922 A1 | 8/1988 |
| WO | 99/60419 A1 | 11/1999 |

* cited by examiner

DISTANCE-MEASURING SENSOR AND METHOD FOR DETECTING AND DETERMINING THE DISTANCE OF OBJECTS

The invention relates to a distance-measuring sensor and to a method for detecting and determining the distance of objects.

A large number of sensors use a signal transit time principle in which this signal transit time, that is the time interval between the transmission and the reception of a signal, is converted into a distance via the propagation speed. In this respect, different frequency ranges of the electromagnetic spectrum such as microwaves and light are thus utilized. Filling level measurement is an area of application for microwaves. In this respect, the signal transit time up to the reflection at a boundary surface of the medium is determined whose filling level is to be measured. In this respect, the radiated microwaves are guided in a probe (TDR, time domain reflectometry) or, alternatively, are freely radiated as in radar and are reflected by the boundary surface.

In optoelectronic sensors in accordance with the principle of the method of the time of flight, light signals are transmitted and the time up to the reception of the light signals remitted or reflected at objects is measured. Optoelectronic distance measurement can be required, for example, in vehicle safety, in logistics automation or factory automation or in safety engineering. The sought output value is mostly the measured distance. Alternatively, a distance measurement device in accordance with the time of flight method can also work in a switching manner in that a distance change of a reflector expected at a specific distance or of a reflecting or remitting object is recognized. A particular application is a reflection light barrier with monitoring of the distance from its reflector. The time of flight process is also the principle according to which distance-measuring laser scanners operate which periodically scan a monitored plane or even a three-dimensional spatial zone. Safe laser scanners are especially used in safety engineering which monitor the configurable protected fields for unauthorized interventions. Safe sensors have to work particularly reliably and must therefore satisfy high safety demands, for example the EN13849 standard for safety of machinery and the machinery standard EN1496 for electrosensitive protective equipment (ESPE). A number of measures have to be taken to satisfy these safety standards such as reliable electronic evaluation by redundant, diverse electronics, function monitoring or specifically monitoring the soiling of optical components, in particular of a front screen, and/or provision of individual test targets with defined degrees of reflection which have to be recognized at the corresponding scanning angles.

The accuracy of the distance measurement decisively depends on how well the reception time point can be determined. Conventional pulse processes transmit a single pulse and determine the position of the echo pulse thereupon received. In this respect, the echo pulse is distinguished from interference signals by a comparator threshold. This only works reliably when the interference signals are distinguishably smaller than the smallest echo pulses to be resolved. Difficulties particularly arise when the received signal is superposed by strong noise, for instance by external light, if a weak useful signal is to be resolved at large distances or if unfavorable environmental conditions are present which cause systematically relatively high echo pulses which should not be detected, for instance from fog, heavy dust pollution of the air or contaminants of a front screen. The conventional countermeasure is the attempt to generate a particularly large signal distance between the lowest useful signal and relevant interference signal levers by construction measures such as optical scattered light suppression, low-noise electronic signal processing and the like. The achieved signal distance then decides on the robustness of the system with respect to the different interference influences.

A time of flight process is known from EP 1 972 961 A1 or EP 2 469 296 A1, for example, which carries out a plurality of individual measurements with a respective one transmitted pulse, instead of a single pulse evaluation, and which sums the respective received signals in a histogram. The useful signal is added by this statistical evaluation, while random noise influences are averaged so that the signal-to-noise ratio is considerably improved. It is a special feature of the process that different measures are taken to be able to carry out this more complex evaluation on particularly inexpensive hardware. This includes only using a zero-threshold comparator which digitizes, that is binarizes, the individual signal with only 1-bit resolution, instead of using a complex, fast A/D converter. In addition, in EP 2 189 804 A1 and EP 2 189 805 A1, the effective scanning rate of such a statistical process is substantially increased by a plurality of measures to detect the reception time point and thus the time of flight with greater time precision. It is disadvantageous that it is hardly possible with this process to distinguish between weak echoes, for example of interfering particles or of the front screen or due to optical or electrical crosstalk, and echoes from objects to be detected. The process is therefore very sensitive, above all to systematic interference signals, under certain circumstances.

It is therefore the object of the invention to improve the reliability of the measured value detection of a distance-measuring sensor.

This object is satisfied by a distance-measuring sensor and by a method for detecting and determining the distance of objects.

A distance-measuring sensor in accordance with the invention comprises:
  a transmitter for transmitting transmitted pulses;
  a receiver for generating a received signal from the transmitted pulses remitted in the monitored zone;
  a first comparator unit for digitizing the received signal with reference to a first threshold;
  a control and evaluation unit which is configured to transmit a plurality of transmitted pulses via the transmitter, to collect the received signals thereupon generated by the receiver in a histogram and to determine a received time point from the histogram and thus to determine a measured value for the signal transit time from the sensor to the object;
  a second comparator unit for digitizing the received signal with reference to a second threshold, wherein the first comparator unit, the second comparator unit and the control and evaluation unit are configured to acquire three digital states of a respective section of the received signal with reference to the first threshold and to the second threshold and to weight the contributions of the section to the histogram in dependence on the digital state.

In this respect, the statistical approach first explained in the introduction is followed of transmitting a plurality of transmitted pulses and of collecting a histogram of the respective digitized received signals thereupon recorded. The invention then starts from the basic idea of not only evaluating the received signal with a first threshold on its digitizing, but also of using a second comparator unit with a second threshold. The pair of first and second comparator units therefore represents a threshold pair which makes it possible not to allow a noise band with interference echoes to be included in the histogram or to do so with a lower evaluation and thereby ultimately to suppress them.

It should be noted that the thresholds in accordance with the invention have a different function than the comparator thresholds of a single pulse process. In the prior art, the point in time of the exceeding of the comparator threshold also determines the reception time point. In accordance with the invention, the first threshold and the second threshold only determine the weight which a respective section of the received signal contributes to the histogram. If it is assumed, without any restriction of generality, that the second threshold is below the first threshold, a first digital state results, for example, when the received signal is below the second threshold, a second digital state is between the thresholds and a third digital state is above the first threshold. A possible weighting does not increment the bin of the histogram belonging to the respective observed section of the received signal for the first digital state, increments it once for the second digital stage and increments it twice for the third digital state. The determination of the received time point only takes place subsequently at the plane of the histogram.

The invention has the advantage that small analog noise levels and small interference echoes are suppressed in the histogram and the sensor thus becomes insensitive with respect to such interference. The conventionally present binomial noise due to the binarizing can practically be completely suppressed. The comparator units act as an extremely effective digital filter which completely suppresses all the signals between the two thresholds. Only large analog noise overshoots still produce noise contributions in the histogram. The noise level in the digital signal is thereby dramatically reduced and the resolution of the distance measurement improved.

The sensor preferably has at least one further pair of comparator units to acquire an odd number of digital states of the respective section of the received signal. Each further pair of comparator units brings along an additional threshold pair. Instead of three digital states, a larger number of digital states can also thereby be distinguished and weighted in the histogram, namely two additional digital states with each pair of comparator units, which produces five digital states with two pairs of comparator units, seven digital states with three pairs of comparator units, and so on. The odd number of digital states is due to the fact that it is actually of no interest within the band with the zero line to be suppressed whether the received signal is positive or negative. Two states which can be distinguished per se are there therefore combined in one digital state. The conventional threshold on the zero line can therefore preferably be fully dispensed with and so a zero-threshold comparator unit together with its evaluation can be saved.

The first threshold and the second threshold preferably have different signs. The digital state between the two thresholds thus comprises the zero line and corresponds to the noise band to be suppressed. The two thresholds particularly preferably have the same magnitude. The digital states thus lie symmetrically about the zero line, namely two of the digital states at the spacing of the magnitude of the thresholds and one digital state with the zero line at its center. In embodiments having a plurality of pairs of comparator units, the symmetry preferably applies to each threshold pair, although it would in principle also be conceivable to distinguish more digital states for one sign of the received signal than for the other sign.

The control and evaluation unit is preferably implemented on a digital component, in particular in programmable logic, in ASIC (application specific integrated circuit) or on an FPGA (field programmable gate array). Such a digital component is comparatively inexpensive and nevertheless able not only to satisfy the demands on a highly precise measurement thanks to the histogram process or pulse averaging process in accordance with the invention, but also to implement a very large number of the required functions instead of providing additional components for this purpose. A digital component should be understood here and in the following as any configurable digital evaluation which is adapted to the application by preconfiguration of the digital circuitry of the component instead of taking place as with a real microprocessor by the running of a program on a universal evaluation unit. The currently preferred variant of such a programmable logic is an FPGA. In the following an FPGA will therefore be spoken of several times as a representative of the named family of digital components; however, the invention is not restricted thereto.

The comparator units are preferably implemented via inputs of the digital component. No additional devices are thereby required or at least only very simple analog switching elements, for example for a resistance network, which supplies the received signal to the desired thresholds according to a plurality of inputs of the digital component. Alternatively, some comparators are also possible as separate circuit elements which then have the advantage that their specification is independent of that of the digital component. This facilitates the use in safety engineering because it is not possible in practice to influence the safe specification of the inputs of the digital component, but reliably specified comparators are available, in contrast.

An analog preprocessing circuit having a filter for converting the initially unipolar received signal into a bipolar signal is preferably arranged between the receiver and the A/D converter. The echoes of the transmitted pulse from objects or disrupters are initially likewise at least roughly in pulse shape, that is they form a peak and are accordingly unipolar. This applies above all to light signals which cannot become negative and accordingly also only generate unipolar received signals. The filter converts the unipolar received signal into a bipolar signal, for example as an oscillation having at least one maximum, one minimum and a zero point therebetween. In particular a bandpass filter or a differentiator is suitable as a filter. The preprocessing circuit can additionally have an amplifier, in particular a transimpedance amplifier, before the filter.

A low pass filter is preferably arranged between the receiver and the comparator units. This is a further example for an analog circuit element which prepares the analog received signal for the comparator units. The low pass filter ensures that the slopes of a received echo are flattened and their time position can therefore be determined more exactly.

The sensor is preferably configured as an optoelectronic sensor, in particular as a laser scanner, with the transmitter being a light transmitter and the receiver being a light receiver. Such sensors based on light are frequently used for distance measurement. They can have one beam, that is be directed to a measured object. However, a laser scanner is also conceivable in which the direction in which the transmitted pulses are transmitted is periodically varied, for example using a rotary mirror, so that a monitored plane or even a spatial zone is scanned. An example for an alternative sensor not based on optical signals is a TDR filling level sensor.

The sensor is preferably configured as a safe sensor having a safety output in which the control and evaluation unit is configured to recognize unauthorized intrusions into protected fields within the monitored zone and thereupon to output a safety-directed shut-down signal at the safety output. Safe sensors are, for example, safety scanners, distance measuring or probing safety light grids or safe 3D time of flight cameras. The known pulse averaging process would be too sensitive for applications in safety engineering. The sensor would also have to output a safety-directed shut-down signal for safety reasons on the detection of a weak interference signal as long as the weak interference signal is not reliably recognized as interference. Due to the suppression of such interference signals in accordance with the invention, a large number of incorrect shut-downs are prevented and the availability of the safe sensor is thus considerably improved.

In a further aspect the invention relates to a method for the detection and determination of the distance of objects in a monitored zone, in which a plurality of transmitted pulses are generated and in which received signals are generated from the transmitted pulses remitted in the monitored zone, said received signals being digitized with the aid of a first comparator unit having a first positive threshold and being collected in a histogram to determine a received time point and thus a measured value for the signal transit time to the object from the histogram, wherein three digital states of a respective section of the received signals are acquired using the first comparator unit and a second comparator unit having a negative second threshold and the contributions of the section to the histogram are weighted depending on the digital state.

The method in accordance with the invention can be designed in a similar manner by further features and shows similar advantages in this respect. Such further features are described in an exemplary, but not exclusive, manner in the dependent claims following the independent claims.

Figure 2:
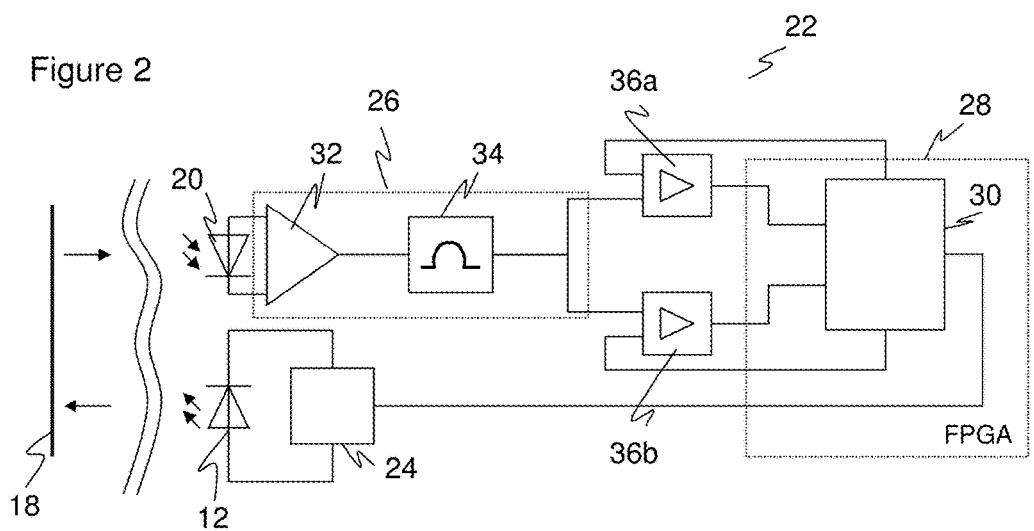
Figure 3:
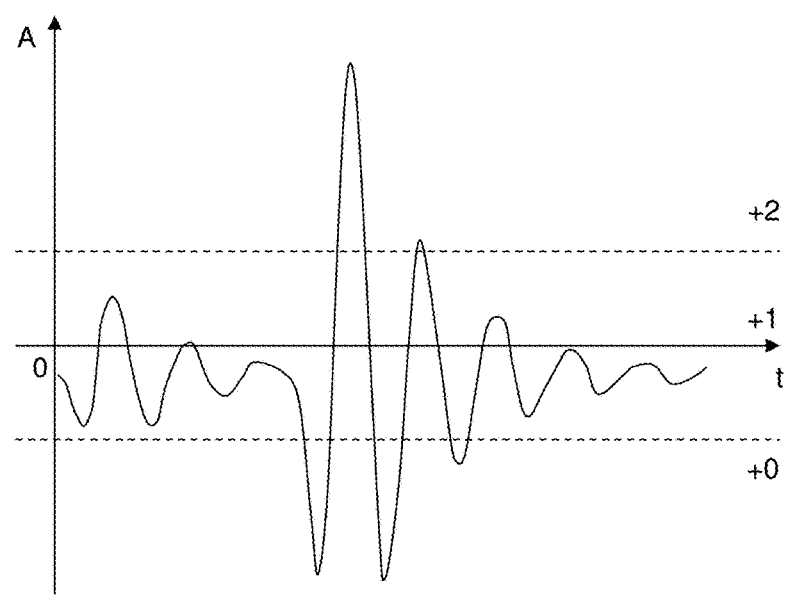
Figure 4:
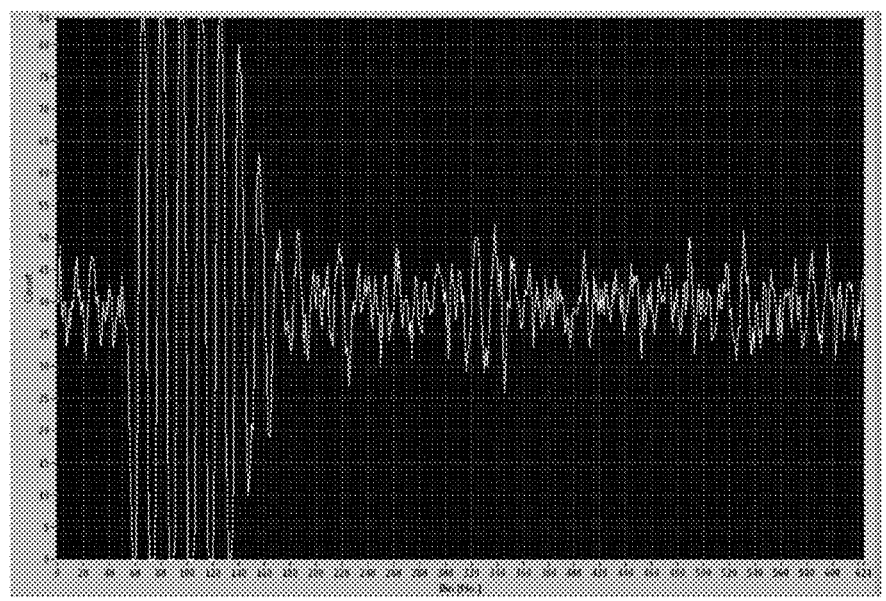
Figure 5:
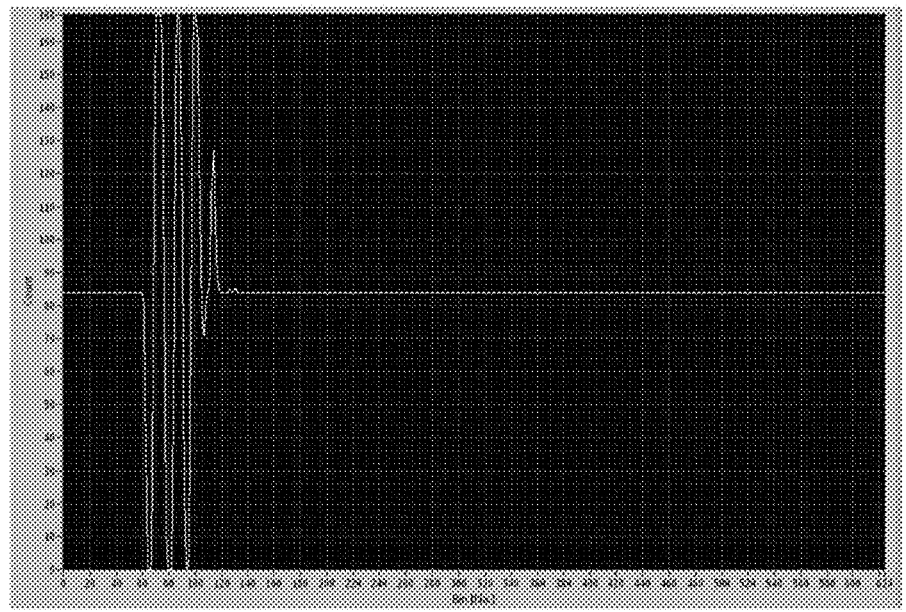
Figure 6A:
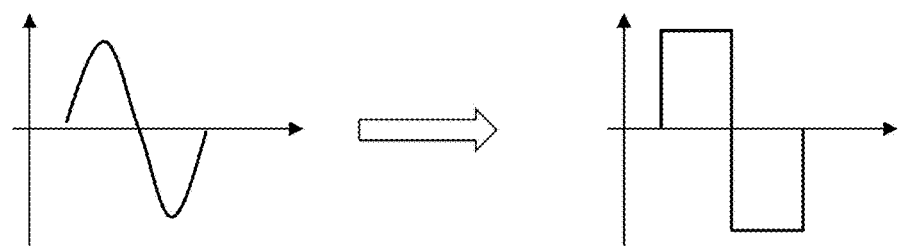
Figure 6B:
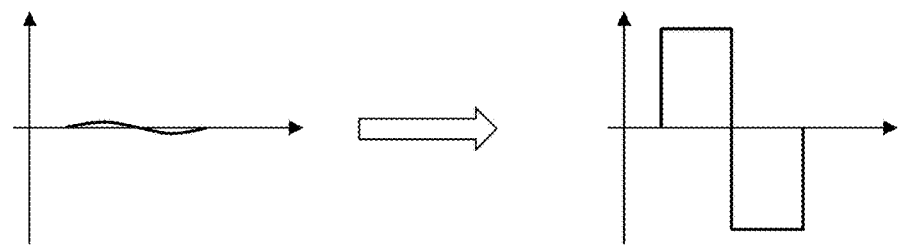
Figure 7:
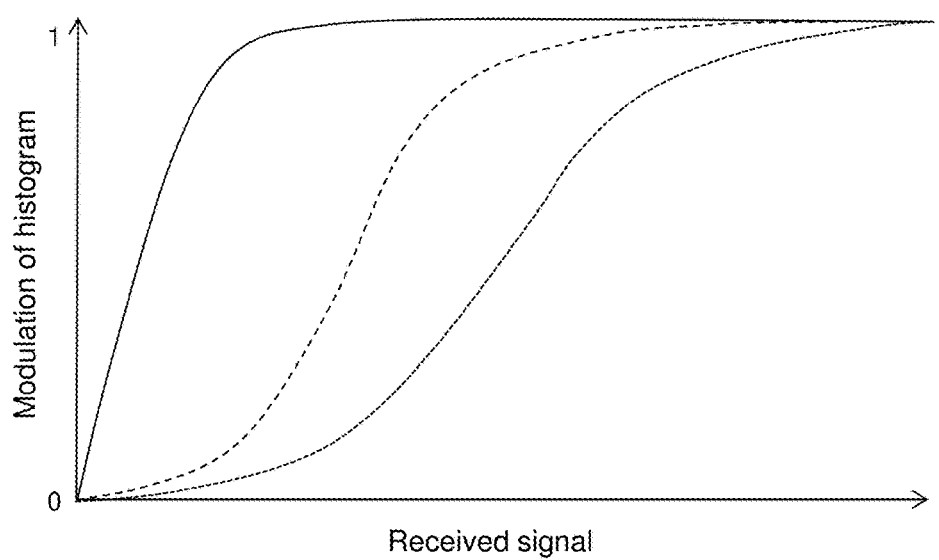

The invention will also be explained in the following with respect to further advantages and features with reference to the enclosed drawing and to embodiments. The Figures of the drawing show in:

FIG. 1 a block diagram of a distance-measuring sensor;

FIG. 2 a block diagram of a measurement core for the signal processing in the sensor in accordance with FIG. 1;

FIG. 3 an exemplary curve of a received signal for explaining the classification of digital states and their weighting by means of two thresholds:

FIG. 4 an exemplary representation of a histogram which is created by a conventional collection over a plurality of transmitted pulses;

FIG. 5 a representation of a histogram which is created by a collection in accordance with the invention with a different weighting of three digital states;

FIGS. 6a-b an idealized representation of a strong useful echo or of a weak interference echo of and the respective associated histogram; and FIG. 7 exemplary characteristic curves of the control of the sensitivity of the histogram with respect to the received signal level for different threshold pairs.

FIG. 1 shows a block diagram of a distance-measuring sensor 10 in an embodiment as a one-dimensional optoelectronic distance probe. A light transmitter 12 is aligned such that its transmitted light transmits a beam splitter 14 and subsequently arrives in a monitored zone via an optics 16.

When an object 18 is located in the beam path, the transmitted light is there reflected or remitted at this object 18 and returns through the optics 16 back to the beam splitter 14 again where it is mirrored in a light receiver 20 and is detected there. The beam splitter arrangement is to be understood purely as an example; the invention equally comprises other arrangements without beam splitters such as dual apertures. The explanation for a one-dimensional optoelectronic sensor is also only to be understood by way of example for the sensor 10 can equally be a multi-dimensional system such as a light grid or a laser scanner or can work with completely different electromagnetic signals like a TDR filling level sensor.

A measurement core 22 controls the light transmitter 12 and evaluates the signals of the light receiver 20. To determine a time of flight for a distance measurement of the object 18, light pulses are transmitted and received again and the difference is determined between the transmission time and the reception time. This evaluation, however, does not take place on the basis of individual events with only one single light pulse, but rather in an evaluation by means of a histogram which is formed by a plurality of individual events.

This static evaluation will now be explained more exactly. FIG. 2 shows a block diagram of the measurement core 22. A driver circuit 24 is provided beside the actual transmitter 12 in a transmission path, whereas the receiver 20 supplies the received signal in a reception path via an analog preprocessor 26 to a control and evaluation unit 30 implemented on an FPGA 28, for example.

The analog preprocessor 26 comprises an amplifier 32, for instance a transimpedance amplifier, which accepts and amplifies the signal of the receiver 20. A downstream filter 34, which can be a bandpass filter or a differentiator, converts the unipolar signal of the pulse into a bipolar signal. The amplifier 32 and the filter 34 can also be connected in reverse order. The analog received signal prepared in this manner is compared in two comparators 36a-b with a respective threshold and the respective comparison result is transferred to the control and evaluation unit 30. The thresholds can be configured as settable by the control and evaluation unit 30. Instead of comparators, other suitable circuit elements can also be used for a threshold comparison, for instance limiter amplifiers which measure without a DC offset correction against a comparison voltage.

Alternatively to the embodiment in accordance with FIG. 2, the digitizing of the received signal takes place in comparators which are implemented via inputs of the FPGA. In this case, the analog preprocessor 26 preferably comprises another circuit which supplies suitable voltage differences, for example a resistance network, to the inputs. In addition, the preprocessor 26 can have a low pass filter, not shown, to reduce the slope steepness of the incoming received signal. A better time resolution thus becomes possible.

FIG. 3 shows a purely exemplary curve of the received signal and, with dashed lines, the two thresholds of the comparators 36a-b. The thresholds are preferably symmetrical to the zero line, that is the mean value of the analog received signal. To detect the analog received signal digitally, a check is made for each sampling time whether the received signal is below the lower threshold, between the thresholds or above the upper threshold. In operation, such analog received signals are repeatedly recorded and are evaluated together in a histogram. In this respect, the contribution of a sampling point depends on which of the three states determined by the thresholds is assigned to the amplitude of the analog received signal associated with the sampling point. In a preferred embodiment shown in FIG. 3, these contributions, which are added into the time-associated bin of the histogram, are the values +0, +1 and +2.

The measurement core in accordance with FIG. 2 determines a distance value as follows. A transmitted signal is transmitted repeatedly a multiple of times which allows the determination of a precise point in time. A rectangular pulse is suitable as the signal shape, but other pulses, such as Gaussian pulses, multimodal signals. for encoded association of each signal, for example, and also steps are conceivable. All these signal shapes will only be called a pulse in the following.

The pulse is reflected at the target object 14 and amplified into an electric signal in the amplifier 32 after conversion in the receiver 20. The received pulse corresponds in its shape, apart from noise effects, to the shape of the transmitted pulse, that is it is a unipolar signal. The unipolar received pulse is converted into a bipolar signal in the filter 34. In other words, the received pulse is utilized to initiate an oscillation. The signal amplitude is thereby transported into the decay behavior of the oscillation, which substantially facilitates the dealing with a large dynamic range. This can be realized with a bandpass filter of a suitable filter frequency.

The bipolar signal is digitized as described with respect to FIG. 3. In the language of histograms, the time axis of the received signal is divided into bins whose width corresponds to the width of the sampling period. The bins are initially set to zero and are incremented by +0, +1 or +2 with each measurement repetition, depending on how high the amplitude is evaluated by the thresholds at that time which is associated with the respective bin. Expressed without a histogram, it is ultimately a discrete integration. The time resolution is initially restricted to bin width and thus to the clock rate at which the comparators 36a-b or the FPGA 28 can sample the analog received signal. This resolution can be increased further by different techniques, such as described in the initially cited EP 2 189 804 A1 and EP 2 189 805 A1; however, this will not be looked at in any more detail here.

FIGS. 4 and 5 show exemplary histograms which were created from the explained accumulation of a histogram from a respective 84 measurement repetitions. They are digital signals which are subsequently further evaluated for determining the received time and thus the time of flight by the control and evaluation unit 30.

In this respect, FIG. 4 shows for a comparison the conventionally recorded digital signal with simple binarization, i.e. when instead of two thresholds in two comparators 36a-b, only one simple threshold is set on the zero line and a received signal above the threshold is added to the bin with +1 and a received signal below the threshold is added with +0. The received pulse is admittedly clearly pronounced by the oscillation triggered by it. However, significant contributions of the binomial noise are also recognized before and after this oscillation.

The occurrence of the binomial noise can easily be explained. The signal value in all bin in which no received pulse occurs is practically, but not exactly, zero. The binarizing threshold makes a random selection in every measurement repetition here. With k=84 measurement repetitions, this produces on average k/2=42 filled bins with a scattering of $\pm\sqrt{k}/2$, just the binomial noise. The binomial noise dominates other noise effects in particular with comparatively few measurement repetitions and the high standard deviation makes the evaluation considerably more difficult.

FIG. 5, in contrast, shows the digital signal acquired from the same analog received signals with an application in accordance with the invention of two thresholds and with a corresponding weighting of the three states thereby defined. The noise background is now shallow and the oscillation is simultaneously clearly delineated. The robustness of an evaluation of this digital signal is substantially improved since both the statistical peak in the binomial noise and smaller interference signals such as due to contaminants on a front screen of the sensor 10 no longer so easily result in incorrect measurements.

An exact time position at which the received time point is determined can recognizably relatively be associated with the oscillation in FIG. 5. The first zero crossing is used for this purpose, for example. The clearly delineated oscillation even has a further advantage due to the so-called bright/dark correction of the distance measurement. This describes the process known per se of estimating the level of the received signal and of correcting the distance again accordingly since otherwise dark targets 18 would seem to be measured at a different distance than bright targets 18. The level estimate is very simple in the digital signal since the integral of the oscillation is a measure for this and is obtained by a simple adding of the respective bins. The sharply delineated oscillation of FIG. 5 visibly provides a much more exact basis for this integral determination than the oscillation of FIG. 4 at which it cannot be delineated where the oscillation ends and where the pure binomial noise starts.

As the comparison of FIGS. 4 and 5 shows, the effect of the two comparators 36a-b with their threshold pair with respect to a conventional binarization goes well beyond what could be expected from a trivalent sampling over a bivalent sampling. This is due to previously not recognized relationships of the initially described known pulse averaging process which are utilized to suppress a noise band by a skilled threshold selection.

The conventional pulse averaging process namely has the initially paradoxical appearing disadvantage that it is too sensitive. The detection limit is in the noise. Even very small signals are registered at small noise levels. Due to the indirect evaluation of the received signal via histograms, it is not the actual analog signal amplitude which is evaluated, but rather the signal-to-noise ratio. This is often not perceived as disturbing outside safety engineering as long as the system is still also only sensitive enough under unfavorable conditions due, for example, to external light or temperature. In safety engineering, however, a safety-directed shut-down has to take place as a precaution as long as interference is not reliably recognized as such or is suppressed so that the availability would be considerably reduced without the measures in accordance with the invention.

These statements will be illustrated again and systemized in FIGS. 6 and 7. FIGS. 6a-b show, in an idealized fashion without noise portions, a strong useful echo and/or a weak interference echo in each case with an associated histogram in the conventional pulse averaging processes. The strong useful echo originates, for example, from an object to be detected and the weak interference echo originates from a small interference body such as a grain of dust. The associated histograms, however, are identical and do not allow any distinction because the interference echo also already completely modulates the histogram. This is due to the fact that the 1-bit digitization only decides whether a signal is above the binarization threshold, that is is positive or not in this case. The strong useful echo and the weak interference echo, however, satisfy this criterion equally and in a manner distinguishable for the histogram.

In an observation as a characteristic curve of the modulation of the histogram with respect to the received signal level in accordance with FIG. 7, this is expressed in the solid characteristic curve quickly asymptotically approaching the full modulation. The dashed S-shaped characteristic curve which suppresses the noise and small interference echoes, in contrast, is reached with the threshold pair of the comparators 36a-b available in accordance with the invention. The differentiation of echoes of differently strongly pronounced echoes can be even further promoted by further threshold pairs of additional comparators which preferably define per threshold pair two additional states with reference to thresholds likewise set symmetrically to the zero line, as the characteristic curve shown in dashed form illustrates.

The invention claimed is:

1. A distance-measuring sensor for detecting and determining the distance of objects in a monitored zone, the distance-measuring sensor comprising:
 a transmitter for transmitting transmitted pulses;
 a receiver for generating a received signal from the transmitted pulses remitted in the monitored zone;
 a first comparator unit for digitizing the received signal with reference to a first threshold;
 a control and evaluation unit which is configured to transmit a plurality of transmitted pulses via the transmitter, to collect the received signals thereupon generated by the receiver in a histogram and to determine a received time point from the histogram and thus to determine a measured value for the signal transit time from the sensor to the object; and
 a second comparator unit for digitizing the received signal with reference to a second threshold, wherein the first comparator unit, the second comparator unit and the control and evaluation unit are configured to acquire three digital states of a respective section of the received signal with reference to the first threshold and to the second threshold and to weight the contributions of the respective section to the histogram in dependence on the digital state, wherein the two thresholds are placed on both sides of a zero line of the received signal, and wherein the digital state between the two thresholds corresponds to a noise band to be suppressed.

2. The sensor in accordance with claim 1, which has at least one further pair of comparator units to acquire an odd number of digital states of the respective section of the received signal.

3. The sensor in accordance with claim 1, wherein the first threshold and the second threshold have different signs and in particular the same magnitude.

4. The sensor in accordance with claim 1, wherein the control and evaluation unit is implemented on a digital component in ASIC or on an FPGA.

5. The sensor in accordance with claim 4, wherein the control and evaluation unit is implemented on a digital component in a programmable logic.

6. The sensor in accordance with claim 4, wherein the comparator units are implemented via inputs of the digital component.

7. The sensor in accordance with claim 1, wherein an analog preprocessing circuit having a filter for converting an initially unipolar received signal into a bipolar signal is arranged between the receiver and the comparator units.

8. The sensor in accordance with claim 1, wherein a low pass filter is arranged between the receiver and the comparator units.

9. The sensor in accordance with claim 1, which is configured as an optoelectronic sensor, wherein the sensor is a light transmitter and the receiver is a light receiver.

10. The sensor in accordance with claim 9, which is configured as a laser scanner.

11. The sensor in accordance with claim 1, which is configured as a safe sensor having a safety output in which the control and evaluation unit is configured to recognize unauthorized intrusions into protected fields within the monitored zone and thereupon to output a safety-directed shut-down signal at the safety output.

12. The sensor in accordance with claim 11, which is configured as a safety scanner.

13. A method for the detection and determination of the distance of objects in a monitored zone, in which a plurality of transmitted pulses are transmitted and in which received signals are generated from the transmitted pulses remitted in the monitored zone, said received signals being digitized with the aid of a first comparator unit having a first positive threshold and being collected in a histogram to determine a received time point and thus a measured value for the signal transit time to the object from the histogram,
 wherein three digital states of a respective section of the received signals are acquired using the first comparator unit and a second comparator unit having a negative second threshold and the contributions of the respective section to the histogram are weighted depending on the digital state, wherein the two thresholds are placed on both sides of a zero line of the received signal, and wherein the digital state between the two thresholds corresponds to a noise band to be suppressed.

* * * * *